(12) United States Patent
Fagan

(10) Patent No.: US 7,962,766 B2
(45) Date of Patent: Jun. 14, 2011

(54) METHOD AND SYSTEM FOR ENCRYPTION-BASED DESIGN OBFUSCATION FOR AN INTEGRATED CIRCUIT

(75) Inventor: John Fagan, Pasadena, MD (US)

(73) Assignee: Atmel Corporation, San Jose, CA (US)

( * ) Notice: Subject to any disclaimer, the term of this patent is extended or adjusted under 35 U.S.C. 154(b) by 156 days.

(21) Appl. No.: 11/182,335

(22) Filed: Jul. 14, 2005

(65) Prior Publication Data

US 2007/0033461 A1   Feb. 8, 2007

(51) Int. Cl.
G06F 11/30 (2006.01)
G06F 12/14 (2006.01)
(52) U.S. Cl. ......................................................... 713/194
(58) Field of Classification Search .................. 713/194; 714/726
See application file for complete search history.

(56) References Cited

U.S. PATENT DOCUMENTS

| | | | | |
|---|---|---|---|---|
| 5,477,493 A | * | 12/1995 | Danbayashi | 365/201 |
| 5,880,523 A | * | 3/1999 | Candelore | 257/679 |
| 2002/0003876 A1 | | 1/2002 | Lim | |
| 2002/0009196 A1 | | 1/2002 | Lim | |
| 2002/0012430 A1 | | 1/2002 | Lim | |
| 2002/0199111 A1 | * | 12/2002 | Clark et al. | 713/194 |
| 2003/0005323 A1 | * | 1/2003 | Hanley et al. | 713/194 |
| 2003/0206627 A1 | * | 11/2003 | Penugonda et al. | 380/2 |

FOREIGN PATENT DOCUMENTS

| | | |
|---|---|---|
| WO | WO-0228127 A | 4/2002 |
| WO | WO-2004081734 A2 | 9/2004 |
| WO | WO-2007/011507 A2 | 1/2007 |

OTHER PUBLICATIONS

"Taiwan Application Serial No. 095123500, Office Action mailed Jun. 26, 2008", 11 pages.
"International Application Serial No. PCT/US2006/024178, Search Report", 2 pgs.

* cited by examiner

*Primary Examiner* — Benjamin E Lanier
*Assistant Examiner* — Cordelia Zecher
(74) *Attorney, Agent, or Firm* — Fish & Richardson P.C.

(57) ABSTRACT

Encryption-based design obfuscation for an integrated circuit includes creating multiple functional circuit paths for an integrated circuit design and selecting among the multiple functional circuit paths during scan testing. Encrypting selection data corresponding to an intended function of the integrated circuit design avoids revealing the intended function as a result of the scan testing.

12 Claims, 1 Drawing Sheet

METHOD AND SYSTEM FOR ENCRYPTION-BASED DESIGN OBFUSCATION FOR AN INTEGRATED CIRCUIT

FIELD OF THE INVENTION

The present invention relates to securing circuit design, and more particularly to encryption-based design obfuscation for integrated circuit designs.

BACKGROUND OF THE INVENTION

The development of integrated circuits (ICs) has become increasingly complex, due in large part to the ever increasing functionality offered by newly developed circuitry. Integrated circuits continue to surpass milestones in development, as more and more functionality is packaged into smaller sizes. This enhanced functionality and the greater number of transistors packaged in an integrated circuit requires more rigorous testing requirements to insure reliability once the device is commercialized. Thus, new integrated circuit designs are repeatedly tested and debugged during the development process to minimize the number and severity of errors that may subsequently arise. Regardless of the rigor of the developmental testing, invariably a certain percentage of manufactured devices will fail prematurely.

Thus, a problem existing in the semiconductor industry is in the testing of manufactured chips. Even assuming a good, error-free logic design, it is well known that various faults and errors can enter into the production process, which can result in functional defects in a manufactured chip. These faults can enter through a variety of causes in the numerous manufacturing process steps and can affect any of the different gates, switches or lines on the chip. To prevent such devices from being sold or used in systems, typically some level of testing is performed on manufactured chips to identify those that may fail prematurely.

A number of different types of testing have been used to minimize the possibility of premature failure of manufactured chips. One of the more popular types of testing is scan testing. Scan testing is a well recognized design-for-test ("DFT") technique used for addressing certain testing problems in very large scale integrated ("VLSI") circuits. A full scan design technique transforms a given sequential circuit into a combinational circuit and shift register (referred to as a scan register) for the purpose of testing. This transformation makes it possible to obtain almost complete fault coverage using an Automatic Test Pattern Generation ("ATPG") program. Typically, as part of the scan test, large circuits are partitioned into smaller combinational circuits to facilitate fault isolation and failure analysis.

The scan design technique implements all or most of the state elements in the device under test, such as flip-flops and latches, as scannable flip-flops, which often are referred to as scan-flops. An ATPG program can treat the state elements as pseudo inputs and outputs of the device. During typical testing, a scan-path is first tested by shifting a simple sequence of 1s and 0s through chained scan-flops. The ATPG program then generates test vectors that are applied to test the combinational logic. The device then returns to normal operational mode, typically for one clock cycle, to capture the response of the combinational circuit in the scan-flops. The captured response is unloaded via the scan-path and, at the same time, the state element values corresponding to the next test vector are loaded. This testing sequence repeats until all test vectors are applied.

Tools exist to help evaluate resulting data from the scan test and identify path(s)/logic gate(s) exhibiting stuck-at faults. While such analysis tools can provide a level of assistance in isolating faults, they also create a level of vulnerability, since use of such tools allows for reverse engineering of the integrated circuit design.

A need exists, therefore, for design obfuscation for an IC, including during scan testing. The present invention addresses such a need.

BRIEF SUMMARY OF THE INVENTION

Aspects of encryption-based design obfuscation for an IC are described. Encryption-based design obfuscation for an integrated circuit includes creating multiple functional circuit paths for an integrated circuit design and selecting among the multiple functional circuit paths during scan testing. Encrypting selection data corresponding to an intended function of the integrated circuit design avoids revealing the intended function as a result of the scan testing.

With the encryption-based design obfuscation of the present invention, the circuit function intended as a circuit design cannot be determined without knowledge of the encrypted select register data. Without the ability to determine the intended function, reverse engineering via scan test analysis is prevented. The present invention achieves this security while supporting scan testing for fault coverage of a circuit design in a straightforward and effective manner. These and other advantages of the aspects of the present invention will be more fully understood in conjunction with the following detailed description and accompanying drawings.

DETAILED DESCRIPTION OF THE INVENTION

The present invention relates to encryption-based design obfuscation for an integrated circuit. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown but is to be accorded the widest scope consistent with the principles and features described herein.

Figure 1:
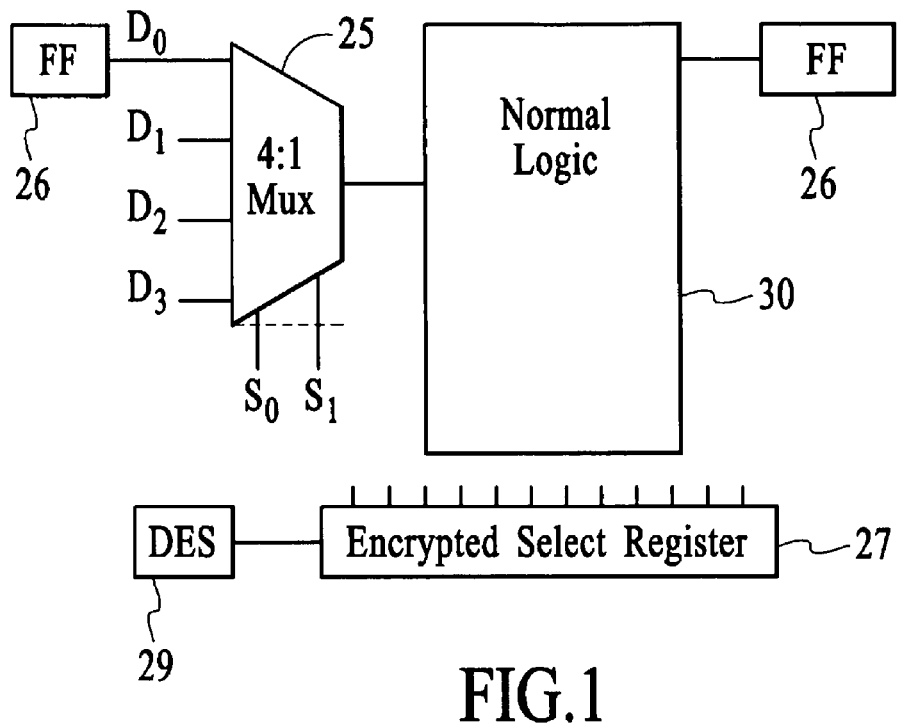
FIG. 1 illustrates a block diagram of an encryption based design obfuscation for an integrated circuit in accordance with the present invention.

FIG. 1 illustrates a block diagram of encryption based design obfuscation for an integrated circuit that avoids revealing the design/reverse engineering as a result of scan testing in accordance with the present invention. A 4:1 MUX (multiplexer) 25 is inserted for use with every flip-flop 26 in the scan test. One input connection of MUX 25 is for the actual functional path of the circuit logic 30 and three input connections can provide valid functional inputs but are not part of the functional path. An n-bit select register 27 is also provided. The number of functional circuits created is $2^n$. Thus, if n=10, 1024 circuits that are deterministic (and non-trivial) input to output functions are provided. However, only one of those circuits is the intended function for the actual design.

In order to secure the design, the intended function selection data is encrypted with an encryptor 29, e.g., an encryption algorithm, such as DES (data encryption standard). The encrypted data provides the selection data for the one intended function that the design developer knows, but which the device tester does not know. Since other selection data selects a functional circuit input, scan testing can still be achieved for fault coverage without revealing actual intended device function. This could allow sensitive (ITAR) designs to be assembled and tested in non-ITAR compliant locations.

Figure 2:
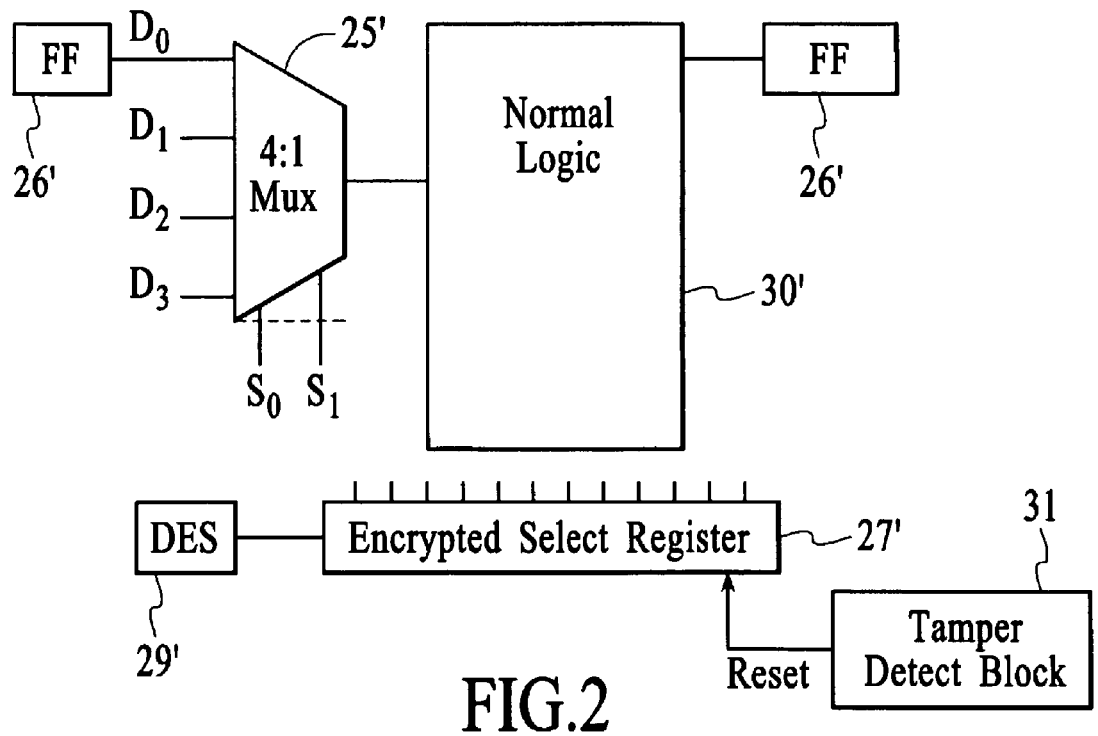
FIG. 2 illustrates a block diagram of the encryption based obfuscation design including a tamper detect block.

Through the utilization of encrypted selection data in accordance with the present invention, the circuit function intended for the design cannot be determined without knowledge of the encrypted select register data. Without the ability to determine the intended function, reverse engineering is prevented. Further, in a preferred embodiment, the register select value for the intended function is lost if power is removed, resulting in all $2^n$ circuits being equally probable for selection. FIG. 2 illustrates the block diagram of the encryption based obfuscation design including a tamper detect block 31. If the power is lost, the circuit will probably be disabled (1 chance in $2^n$ of powering up in operational state). Use of a power on reset circuit, and adding a reset function to the n-bit register 27 will guarantee powering up in a non-operational mode. In addition, if the tamper detection block 31 is added to the device or system, conditions such as overvoltage, undervoltage, illegal clock frequency, or sudden temperature change, can be used to reset the n-bit select register to a false state even while operating. If this occurs, the device continues to operate, in a benign fashion, with no apparent indication that tamper detection has occurred. Thus, the 'real' circuit can be disabled in the case of tamper detection. In addition, the selection bits do not have be unique but can be shared among the registers in a circuit design, as is well appreciated by those skilled in the art.

Although the present invention has been described in accordance with the embodiments shown, one of ordinary skill in the art will readily recognize that there could be variations to the embodiments and those variations would be within the spirit and scope of the present invention. For example, although DES is described for use as the encryption algorithm, other encryption algorithms may be used according to design needs, as is well understood in the art. Accordingly, many modifications may be made by one of ordinary skill in the art without departing from the spirit and scope of the appended claims.

I claim:

1. A method for encryption-based design obfuscation for an integrated circuit, the method comprising:
    providing multiple input connections, wherein one of the multiple input connections is for an actual functional path of an intended function for the integrated circuit and the others of the multiple input connections are not part of the actual functional path and provide other functions;
    selecting the intended function with an n-bit select register from $2^n$ functions for use during scan testing;
    encrypting function selection data related to selecting the intended function to avoid revealing the intended function as a result of scan testing; and
    upon a tamper detection, resetting the n-bit select register to a false state while the integrated circuit is operating such that functions other than the actual functional path continue to operate.

2. The method of claim 1 wherein encrypting function selection data further comprises encrypting the data of the n-bit select register with a data encryption standard (DES) algorithm.

3. The method of claim 1 wherein functions further comprises a plurality of deterministic and non-trivial input to output functions.

4. The method of claim 1 wherein n is an integer greater than 1.

5. A system for encryption-based design obfuscation for an integrated circuit, the system comprising:
    functional path logic of the integrated circuit, the functional path logic including an intended function for the intended integrated circuit and a plurality of functions that are not the intended function;
    a selection device for storing function selection data to direct selection of the intended function from $2^n$ functions with an n-bit select register;
    an encryptor for encrypting the stored function selection data corresponding to the intended function, to avoid revealing the intended function as a result of scan testing; and
    wherein the encrypted function selection data is lost upon a tamper detection to result in equal probability for selection of each of the $2^n$ functions such that the intended function is not selected.

6. The system of claim 5 wherein the selection device further stores the encrypted function selection data from the encryptor as data encrypted in accordance with a data encryption standard (DES) algorithm.

7. The system of claim 5 wherein each of the $2^n$ functions further comprises a deterministic and non-trivial input to output functional circuits.

8. The system of claim 5 wherein n is an integer greater than 1.

9. A method for encryption-based design obfuscation for an integrated circuit, the method comprising:
    encrypting function selection data that identifies an intended function for an integrated circuit design;
    selecting the intended function with an n-bit select register from $2^n$ functions based on the encrypted function selection data; and
    losing the encrypted function selection data upon a tamper detection to result in equal probability for selection of each of the $2^n$ functions such that the intended function is not selected.

10. The method of claim 9, further comprising losing the encrypted function selection data if the power is removed.

11. The method of claim 9, further comprising establishing all $2^n$ functions to be equally probably if the power is removed.

12. A method, comprising:
    selecting an input corresponding to a desired functional path in an integrated circuit, the input selected with an n-bit select register from $2^n$ inputs representing valid functional paths;
    encrypting function selection data representing the selected input to avoid revealing the functional path corresponding to the input when a scan test is performed on the integrated circuit; and
    losing the encrypted function selection data upon a tamper detection to result in equal probability for selection of each of the $2^n$ functions such that the intended function is not selected.

* * * * *